United States Patent Office 3,361,807
Patented Jan. 2, 1968

3,361,807
PROCESS FOR THE CO-OXIDATION OF CYCLO-HEXANE AND A KETONE HAVING AN ALPHA-METHYLENE GROUP
Leonard Andrew Duncanson and Herbert George Lawley, Norton-on-Tees, England, assignors to Imperial Chemical Industries Limited, London, England, a corporation of Great Britain
No Drawing. Filed Aug. 2, 1963, Ser. No. 299,476
Claims priority, application Great Britain, Aug. 9, 1962, 30,629/62
13 Claims. (Cl. 260—533)

This invention relates to the production of oxygen-containing organic compounds.

It has already been proposed to produce oxygen-containing organic compounds, particularly carboxylic acids and alcohols and/or ketones, by contacting a liquid mixture containing an aldehyde together with a paraffin and/or a cycloparaffin and/or a substituted derivative thereof at an elevated temperature with a gas containing molecular oxygen.

We have now found that a process of this type may be carried out using, instead of an aldehyde, a ketone containing an alpha-methylene group.

Thus according to the present invention, there is provided a process for the co-oxidation of a paraffin or a cycloparaffin together with a ketone containing an alpha-methylene group which comprises the step of bringing these compounds together at a temperature of 50° to 200° in the presence of molecular oxygen.

By the present process, paraffins and cycloparaffins may be converted to oxygen-containing compounds, notably alcohols, ketones and carboxylic acids. These products may contain the same number of carbon atoms as the starting material and they may have the same carbon skeleton, or degradation may take place during the reaction so that the products have a smaller number of carbon atoms than the starting material. For instance, when using cyclohexane as the starting material, a product comprising cyclohexanone, cyclohexanol and adipic acid may be obtained. On the other hand, when using an alkyl cyclohexane, in which the alkyl group is extensively branched, degradation is likely to occur.

When a paraffin is used as the starting material, this may contain 3 to 15 carbon atoms or more and may have a straight or branched chain. As with cycloparaffins, branched chains tend to favour the production of compounds having fewer carbon atoms than the starting material. Cycloparaffins which may be used include cyclohexane, methylcyclohexane and isopropylcyclohexane.

By the term "a ketone containing an alpha-methylene group" as used in this specification is meant a ketone in which a $CH_2$ group as such is adjacent to a carbonyl group; it is not sufficient for the methylene group to form part of a methyl group. The most suitable ketone for use in the present process is methyl ethyl ketone, but it is possible to use higher mono-ketones, i.e. those containing 5 or more carbon atoms, such as pentanones, for example n-pentanone-2 or -3. It is also possible to use di-ketones containing one or more methylene groups adjacent to the carbonyl groups, for example 2:5-hexanedione.

The present process is sometimes preferably carried out in the presence of a diluent, which is most suitable a carboxylic acid. Thus, in the oxidation of cyclohexane in the presence of methyl ethyl ketone, the incorporation of a carboxylic acid, preferably acetic acid, is beneficial when operation is carried out at 115° C., but at higher temperatures, for example 135° C., the use of a carboxylic acid diluent does not have such a marked effect. Any suitable quantity of carboxylic acid diluent may be used; for example, the weight of this may be equal to the weight of hydrocarbon to be oxidized or a smaller or larger quantity may be used. The preferred diluent is acetic acid, because acids containing $CH_2$ or CH groups are more susceptible to oxidative degradation than is acetic acid.

The process of the present invention is preferably carried out in the presence of at least one salt of one or more metals of variable valency, for example salts of cobalt and/or manganese. If a metal salt of this type is employed, the metal concentration suitably lies in the range of 5 to 5000 parts per million by weight of the reaction mixture and preferably in the range 50 to 1000 parts per million. The metals in question are preferably used in the form of salts which are soluble in the reaction mixture, for example chlorides, bromides, acetates, naphthenates, stearates, oleates, benzoates acetoacetates and acetonyl acetates.

Initiators which may be used instead of or in addition to salts of metals of variable valency as already disclosed are ultra-violet light and ozone. Furthermore, the use of hydrogen peroxide as an initiator is of importance. These have the effect of decreasing the induction time and also enable a higher reaction efficiency to be achieved, based on ketone consumption. A wide range of organic compounds may be used as initiators in the present process; these include alkyl hydroperoxides and dialkyl peroxides having formulae R—O—O—H and R—O—O—R respectively, where R is an alkyl group such as tetiary-butyl; ketone peroxides such as methyl ethyl ketone peroxide; diacyl peroxides such as diacetyl peroxide or cyclohexyl sulphonyl acetyl peroxide; dialkyl peroxy dicarbonates such as di-isopropyl peroxy dicarbonate; peroxy esters such as tertiary butyl perbenzoate and azo compounds, such as azo-bis-isobutyronitrile.

Beneficial results may also be obtained by using an aldehyde, preferably acetaldehyde, in conjunction with the methyl ethyl ketone. By operating in this way, the induction period for the co-oxidation reaction is diminished and the reaction efficiency, based on the amount of methyl ethyl ketone converted, is improved.

Again, the presence of water in the co-oxidation reaction decreases the pass yield of desirable hydrocarbon oxidation products, and the quantity of these products based on the amount of methyl ethyl ketone consumed. Furthermore, when cyclohexane is used as the starting material, and adipic acid is the desired product, water appears to decrease the amount of adipic acid formed compared with the total quantity of cyclohexanol and cyclohexanone. Thus, depending on the products which it is desired to obtain, water may be removed with advantage continuously or at intervals throughout the co-oxidation.

The process of the present invention is preferably carried out at a temperature in the range of 80° to 140° C. Atmospheric or any suitable elevated pressure up to 100 atmospheres or above may be used, the pressure being high enough to maintain the reaction mixture in the liquid phase at the temperature employed and preferably being high enough to maintain a sufficiently high concentration of dissolved oxygen for the reaction to proceed at a suitable speed and also to minimize losses by entrainment. The use of diluted oxygen makes the use of elevated pressures more desirable.

The gas containing molecular oxygen may be oxygen itself, air, mixtures of nitrogen and oxygen, and oxygen together with any suitable diluent such as carbon dioxide or the hydrocarbon to be oxidized. If possible, operation is effected outside the explosive limits.

The process may be carried out in a batchwise manner or continuously. Alternatively it may be carried out semi-continuously by, for example, having all the hydrocarbons present initially in the reaction vessel and adding the ketone as the reaction proceeds. The molar ratio ketone:

hydrocarbon may be varied over a wide range, for example from 1:100 to 1:1. For the system methyl ethyl ketone/cyclohexane, the molar ratio of these preferably lies in the range 1:10 to 1:1.

A variety of materials may be used for constructing the reactor and subsidiary equipment used in the present process. For example, when a halide is not employed, aluminium, the metal sold under the registered trademark "Staybrite," tin, glass, porcelain, enamel and resins may be used. When a halide is employed, it is desirable for the reactor and auxiliary equipment to be made of or lined with titanium.

The present process enables a difficultly-oxidizable compound to be readily oxidized by operating in the presence of a ketone containing an alpha-methylene group. In this way, relatively mild conditions may be employed. The process of the present invention has the further advantages over processes which do not use the co-oxidant that the rate of oxidation is higher at a given temperature, and that oxidation proceeds to a greater extent, in that ketones and/or carboxylic acids are formed rather than alcohols.

The present process may be used for the production of adipic acid which is useful in polymer manufacture. Again, it may be used for the production of cyclohexanone and cyclohexanol which can be used, for example in the manufacture of adipic acid, phenol and caprolactam.

EXAMPLE 1

In Run 1, a mixture of cyclohexane (672 grams; 8.0 moles) glacial acetic acid (672 grams) and cobaltous naphthenate (4.0 grams, containing 10.0% by weight cobalt equivalent to 298 parts per million cobalt based on the total weight of cyclohexane and acetic acid) was charged to an aluminium-lined pressure oxidation unit having a volume of 3 liters. The reaction mixture was heated to a temperature of 115° C. under a pressure of 400 lbs. per square inch gauge. Methyl ethyl ketone (288 grams; 4.0 moles) and an oxygen-nitrogen mixture (10% by volume oxygen; 1130 liters per hour) were then fed as separate streams into the reaction mixture during the course of 124 minutes. In this time, 5.70 moles of oxygen were absorbed. The crude reaction product, reactor washings and exit gas were analyzed. In this way, it was found that 436.7 grams of cyclohexane and 239.0 grams of methyl ethyl ketone were unchanged so that the conversions of these compounds were 35.0% and 17.0% respectively. The products included cyclohexanol (23.8 grams), cyclohexanone (15.9 grams), cyclohexyl acetate (7.9 grams), adipic acid (80.5 grams), glutaric acid (8.9 grams), succinic acid (9.0 grams), water (58.5 grams), carbon monoxide (7.8 grams) and carbon dioxide (30.8 grams). The total amount of acetic acid recovered in the crude product and washings was 693.9 grams, 21.9 grams of which, together with that appearing as cyclohexyl acetate, must have been produced during the oxidation, presumably largely from methyl ethyl ketone oxidation. The total make of esters, other than cyclohexyl acetate, was only 0.071 equivalent.

From these results it was calculated that the molar pass yield of known cyclohexane oxidation products (i.e. cyclohexanol, cyclohexanone, cyclohexyl acetate, adipic acid, glutaric acid and succinic acid) was 14.4%. The molar ratio of the total quantity of cyclohexanone and cyclohexanol to adipic acid produced was 0.72:1. For each mole of cyclohexane consumed, 0.10 mole of carbon monoxide and 0.25 mole of carbon dioxide were produced.

This experiment was repeated using various quantities of cyclohexane and acetic acid and comparative runs were carried out in the absence of methyl ethyl ketone (runs 4, 6 and 8). Runs 2-4 were carried out at the same temperature as Run 1, while Runs 5-8 were carried out at higher temperatures in the range of 130-138° C.

The composition of the starting materials in Runs 1-8 is summarised in Table 1 below.

TABLE 1

| Run | Cyclohexane (grams) | Acetic acid (grams) | Cobalt naphthenate (grams) | Methyl ethyl ketone (grams) |
|---|---|---|---|---|
| 1 | 672 | 672 | 4.0 | 288 |
| 2 | 1,209 | 135 | 4.0 | 288 |
| 3 | 1,344 | Nil | 4.0 | 288 |
| 4 | 672 | 672 | 4.0 | Nil |
| 5 | 1,344 | Nil | 4.0 | 288 |
| 6 | 1,344 | Nil | 4.0 | Nil |
| 7 | 1,209 | 135 | 4.0 | 288 |
| 8 | 1,209 | 135 | 4.0 | Nil |

In Table 2 given below, the reaction efficiencies for these runs were given:

TABLE 2

| Run | Cyclohexane conversion (percent) | Methyl ethyl ketone conversion (percent) | Molar pass yield of known cyclohexane oxidation products (percent) | Molar ratio K+A/AA | Moles of carbon oxides per mole cyclohexane consumed |
|---|---|---|---|---|---|
| 1 | 35.0 | 17.0 | 14.4 | 0.72 | 0.35 |
| 2 | 12.8 | 2.8 | 4.5 | 7.5 | 0.09 |
| 3 | 6.8 | 4.6 | 1.4 | 15.3 | 0.22 |
| 4 | 10.5 | | 1.1 | 1.6 | 0.66 |
| 5 | 28.6 | 9.2 | 16.3 | 4.2 | 0.16 |
| 6 | 14.9 | | 7.8 | 6.0 | 0.11 |
| 7 | 34.2 | 5.2 | 17.5 | 3.2 | 0.21 |
| 8 | 20.4 | | 8.3 | 7.8 | 0.12 |

In this table, K=cyclohexanone, A=cyclohexanol, AA=adipic acid.

In Runs 1 and 7 the amounts of cyclohexyl acetate formed were 7.9 and 4.5 grams respectively; in the other runs, minor amounts only, i.e. less than about 2 grams of this compound, were formed.

In the runs described above, it is believed that the methyl ethyl ketone converted goes largely to acetic acid. Thus, in Run 1, 0.42 mole of acetic acid (including that appearing as cyclohexyl acetate) was produced while 0.68 mole of methyl ethyl ketone was consumed, while in Run 5 the total amount of acetic acid produced and methyl ethyl ketone consumed was in each case 0.37 mole.

EXAMPLE 2

In this example, a mixture of cyclohexane (672 grams; 8.0 moles), glacial acetic acid (672 grams) and cobaltous naphthenate (4.0 grams) was oxidized in the presence of methyl ethyl ketone (288 grams; 4.0 moles) as described in Example 1, the temperature being 95-97° C. The methyl ethyl ketone conversion was 4.0% compared with 17.0% obtained in Example 1, Run 1 at 114-115° C. Again the molar pass yield of known cyclohexane oxidation products was 4.1% compared with 14.4% in Example 1, Run 1, while the molar ratio of (cyclohexanone+ cyclohexanol) : adipic acid was 2.3:1 against 0.72:1. It is thus evident that temperatures in the vicinity of 95° C. are inferior for the present purpose to those in the vicinity of 115° C. Comparisons of the results obtained in Runs 3 and 5 and in Runs 2 and 7 of Example 1 indicate that operation in the vicinity of 115° C. is less satisfactory than that in the vicinity of 135° C. and, under the conditions described, the latter is likely to be the most suitable temperature for carrying out the process under consideration.

EXAMPLE 3

This example shows the effect of varying the cyclohexane: methyl ethyl ketone ratio.

A series of starting materials were made up as shown in Table 3 below:

TABLE 3

| Run | Cyclo-hexane (grams) | Acetic acid (grams) | Cobalt naph-thenate (grams) | Methyl ethyl ketone (grams) | Cyclo-hexane, methyl ethyl ketone molar ratio |
|---|---|---|---|---|---|
| 1 | 672 | 672 | 4.0 | 0 | -- |
| 2 | 672 | 672 | 4.0 | 72 | 8 |
| 3 | 672 | 672 | 4.0 | 144 | 4 |
| 4 | 672 | 672 | 4.0 | 288 | 2 |
| 5 | 1,344 | 0 | 4.0 | 0 | -- |
| 6 | 1,344 | 0 | 4.0 | 144 | 8 |
| 7 | 1,344 | 0 | 4.0 | 288 | 4 |

The reaction was carried out as described in Example 1, the temperature in Runs 1–4 being in the range of 113–117° C., and that in Runs 5–7 being in the range of 130–138° C. The reaction products were analysed and the results obtained are summarized in Table 4 below.

TABLE 4

| Run | Cyclo-hexane conversion (percent) | Methyl ethyl ketone conversion (percent) | Molar pass yield of known cyclo-hexane oxidation products (percent) | Molar ratio K+A/AA | Moles of carbon oxides per mole cyclo-hexane consumed |
|---|---|---|---|---|---|
| 1 | 10.5 | -- | 1.1 | 1.6 | 0.66 |
| 2 | 24.7 | 29.7 | 9.2 | 0.90 | 0.12 |
| 3 | 36.2 | 23.3 | 15.1 | 0.61 | 0.47 |
| 4 | 35.0 | 17.0 | 14.4 | 0.72 | 0.35 |
| 5 | 14.9 | -- | 7.8 | 6.0 | 0.11 |
| 6 | 24.8 | 42.0 | 13.3 | 4.3 | 0.12 |
| 7 | 28.6 | 9.2 | 16.3 | 4.2 | 0.16 |

These results show that in general an increase in the proportion of methyl ethyl ketone relative to cyclohexane leads to an increase in cyclohexane conversion, an increase in the molar pass yield of known cyclohexane oxidation products and an increase in the ratio of adipic acid relative to the total quantity of cyclohexanone and cyclohexanol. However, a point is clearly reached at which an increase in the proportion of methyl ethyl ketone has little effect and this point may be dependent on temperature.

EXAMPLE 4

Example 3, Run 2 was repeated except that 40 grams of hydrogen peroxide containing 31.4 grams $H_2O_2$ per 100 ml. were added to the reaction mixture. The reaction efficiencies were substantially the same as before except that the methyl ethyl ketone conversion dropped to 5.8% so that the extent of oxidative attack on cyclohexane per unit of methyl ethyl ketone consumed was higher in the presence than in the absence of hydrogen peroxide, indicating that the latter had assisted the oxidation. Furthermore, in the presence of hydrogen peroxide, the induction period was 35 minutes whereas that in Example 3, Run 2 was 85 minutes.

EXAMPLE 5

Example 3, Run 3 was repeated except that water (40 grams) was incorporated in the reaction mixture. The conversions of cyclohexane and methyl ethyl ketone were decreased as was the pass yield of known cyclohexane oxidation products. The product also contained a higher total amount of cyclohexanone and cyclohexanol relative to adipic acid. The induction period was unchanged. This example shows that the benefits obtained in Example 4 by the use of aqueous hydrogen peroxide were in no way attributable to the water present in this reagent and indicate moreover that water itself has an undesirable effect on the reaction.

EXAMPLE 6

Example 3, Run 3 was again repeated, but this time acetaldehyde (11.0 grams; 0.25 mole) was charged to the reaction zone, the amount of acetic acid diluent being decreased to 657 grams. The reaction efficiencies were similar to those in Example 3, Run 3 except that the methyl ethyl ketone conversion was lower (8.5% compared with 23.3%) and the ratio of known products to the quantity of methyl ethyl ketone consumed was consequently higher. The induction period was greatly decreased by the presence of the acetaldehyde; it was certainly less than 15 minutes and probably less than 5 minutes whereas that in Example 3, Run 3 was 50 minutes.

EXAMPLE 7

A mixture of n-octane (672 grams; 5.895 moles), acetic acid (672 grams), and cobaltous naphthenate (4.0 grams, equivalent to 298 parts per million cobalt on the total weight of n-octane and acetic acid) was charged to the apparatus used in Example 1 and heated to 114–118° C. under a pressure of 400 lbs. per square inch gauge. Methyl ethyl ketone (288 grams; 4.0 moles) and an oxygen-nitrogen mixture were then injected as separate streams into the mixture over 123 minutes. The oxygen-nitrogen mixture contained 10% by volume oxygen and it was injected at a rate of 1130 liters per hour.

The crude product (1620.9 grams) was fractionally distilled under vacuum to remove unchanged reactants and the residue (509.4 grams) was analysed for the total ketone and the total alcohol contents.

The above experiment was repeated under substantially the same conditions except that no methyl ethyl ketone was injected. The results obtained in these two experiments are summarised in Table 5 below.

TABLE 5

| | With methyl ethyl ketone | Without methyl ethyl ketone |
|---|---|---|
| Total make of octanols (moles) | 0.267 | 0.275 |
| Total make of octanones (moles) | 0.089 | 0.066 |
| Molar pass yield octanols+octanones, percent | 6.04 | 5.79 |
| Molar ratio octanols, octanones | 3.00 | 4.17 |

By gas-liquid chromatography, it was shown that the octanols and octanones mentioned above were substantially octanols-2, -3 and -4, and octanones-2, -3 and -4 respectively.

We claim:

1. A process for the co-oxidation of a ketone containing an alpha-methylene group together with cyclohexane to produce a corresponding organic oxygen-containing compound having the same number of carbon atoms as said cyclohexane which comprises bringing said ketone and said cyclohexane together at a temperature of 50° to 200° C. in the presence of molecular oxygen, the molar ratio of ketone to cyclohexane being in the range of 1:10 to 1:1.

2. A process as claimed in claim 1 in which the ketone is selected from the group consisting of methyl ethyl ketone, n-pentanone-2 and n-pentanone-3.

3. A process as claimed in claim 1 in which the ketone is a di-ketone containing at least one methylene group adjacent to a carbonyl group.

4. A process as claimed in claim 1 in which there is present an initiator selected from the group consisting of ozone; hydrogen peroxide; alkyl hydroperoxides having a formula R—O—O—H, where R is an alkyl group; dialkyl peroxides having a formula R—O—O—R, where R is an alkyl group; ketone peroxides; diacyl peroxides; dialkyl peroxy dicarbonates; peroxy esters and azo compounds.

5. A process as claimed in claim 1 in which water is removed during the co-oxidation.

6. A process as claimed in claim 1 in which the reaction is carried out at a temperature in the range of 80° to 140° C.

7. A process as claimed in claim 1 in which the pressure is from atmospheric to 100 atmospheres.

8. A process as claimed in claim 1 in which there is present at least one salt of a metal of variable valency selected from the group consisting of cobalt and manganese, the metal concentration lying in the range of 5 to 5000 parts per million by weight of the reaction mixture.

9. A process as claimed in claim 8 in which the metal salt is a salt soluble in the reaction mixture selected from the group consisting of chlorides, bromides, acetates, naphthenates, stearates, oleates, benzoates, acetoacetates and acetonylacetates.

10. A process as claimed in claim 1 in which an aldehyde is incorporated in the reaction mixture.

11. A process as claimed in claim 10 in which the aldehyde is acetaldehyde.

12. The process of claim 1 in which there is present a carboxylic acid.

13. A process as claimed in claim 12 in which the carboxylic acid is acetic acid.

References Cited

UNITED STATES PATENTS

| | | | |
|---|---|---|---|
| 2,223,494 | 12/1940 | Loder | 260—586 |
| 2,265,948 | 12/1941 | Loder | 260—597 |
| 2,432,949 | 7/1947 | Rust et al. | 204—162 |
| 2,557,281 | 6/1951 | Hamblet et al. | 260—533 X |

LORRAINE A. WEINBERGER, *Primary Examiner.*

R. K. JACKSON, *Examiner.*

S. B. WILLIAMS, V. GARNER, *Assistant Examiners.*